(12) United States Patent
Oh (10) Patent No.: US 11,587,379 B2
(45) Date of Patent: Feb. 21, 2023

(54) SYSTEM AND METHOD FOR AUTHENTICATING USER OF ROBOTAXI

(71) Applicants: Hyundai Motor Company, Seoul (KR); Kia Corporation, Seoul (KR)

(72) Inventor: Da Ye Oh, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/366,372

(22) Filed: Jul. 2, 2021

(65) Prior Publication Data

US 2022/0198847 A1 Jun. 23, 2022

(30) Foreign Application Priority Data

Dec. 21, 2020 (KR) ........................ 10-2020-0180240

(51) Int. Cl.
*G07C 9/00* (2020.01)
(52) U.S. Cl.
CPC ..... *G07C 9/00182* (2013.01); *G07C 9/00309* (2013.01); *G07C 9/00563* (2013.01); *G07C 9/00571* (2013.01); *G07C 2009/00769* (2013.01)

(58) Field of Classification Search
None
See application file for complete search history.

(56) References Cited

U.S. PATENT DOCUMENTS

| 9,805,605 | B2 * | 10/2017 | Ramanujam | G06Q 10/00 |
| 10,155,499 | B1 * | 12/2018 | Mazaira | B60R 25/257 |
| 10,511,943 | B2 * | 12/2019 | Venkatraman | H04L 67/104 |
| 11,192,543 | B2 * | 12/2021 | Glenn | B60W 30/181 |

* cited by examiner

*Primary Examiner* — Daniell L Negron
(74) *Attorney, Agent, or Firm* — Slater Matsil, LLP (57) ABSTRACT

An embodiment system for authenticating a user of a robotaxi includes a smart phone configured to request an authentication of the user based on a digital key, an authentication server configured to create a first authentication number, transmit the first authentication number to the smart phone, receive a second authentication number from the robotaxi when the authentication using the digital key fails, and request unlocking of a door to the robotaxi when the first authentication number and the second authentication number match, and the robotaxi configured to receive the second authentication number from the user, transmit the second authentication number to the authentication server, and unlock the door in response to the request from the authentication server.

20 Claims, 6 Drawing Sheets

SYSTEM AND METHOD FOR AUTHENTICATING USER OF ROBOTAXI

CROSS-REFERENCE TO RELATED APPLICATIONS

This application claims the benefit of Korean Patent Application No. 10-2020-0180240, filed on Dec. 21, 2020, which application is hereby incorporated herein by reference.

TECHNICAL FIELD

The present disclosure relates to a system and a method for authenticating a user of an autonomous driverless taxi (robotaxi).

BACKGROUND

The 'MOTIONAL', Hyundai Motor Company's US autonomous driving joint venture, is speeding up preparations for commercialization of autonomous driving.

The 'MOTIONAL' is recently allowed, by the state of Nevada in the United States, where Las Vegas is located, to conduct an autonomous driving test for traveling on a regular road without a driver. The 'MOTIONAL' is the first in Nevada to conduct the autonomous driving test in a state in which the driver is not on board. The 'MOTIONAL' plans to put a person in a passenger seat for safety, but plans to check an autonomous driving technology of a level 4 in an actual road situation while leaving a driver's seat empty. The level 4 is an autonomous driving stage in which the person does not intervene in driving although there is the driver's seat in case of an emergency. A Chrysler's Pacifica minivan is put in the test.

With this test, the 'MOTIONAL' has taken a step closer to commercialization of an autonomous taxi (a robotaxi) in 2022. The 'MOTIONAL' is the joint venture to which Hyundai Motor Company and Aptiv, which is a US autonomous driving company, invested $2 billion each in September 2019, and has launched a robotaxi pilot business in Singapore, Las Vegas, and the like.

A conventional technology for authenticating a user of the robotaxi is in a scheme using a smart phone on which a digital key application is installed. When the user calls the robotaxi using the smart phone and then requests unlocking of a door of the robotaxi to a server, the server authenticates the user. When the server commands a door lock/unlock controller equipped in the robotaxi to unlock the door, the door lock/unlock controller unlocks the door.

Such a conventional technology has a problem in that the user of the robotaxi is not able to be authenticated when an authentication error occurs despite a normal digital key, or when the smart phone dies after calling the robotaxi.

The matters described in this background are written to enhance an understanding of the background of the invention, and may include matters other than the prior art already known to those of ordinary skill in the field to which this technology belongs.

SUMMARY

The present disclosure relates to a system and a method for authenticating a user of an autonomous driverless taxi (robotaxi). Particular embodiments relate to a technology for authenticating a user who has called a robotaxi.

Embodiments of the present disclosure can solve problems occurring in the prior art while advantages achieved by the prior art are maintained intact.

An embodiment of the present disclosure provides a system and a method for authenticating a user of a robotaxi that may authenticate the user of the robotaxi by authenticating the user of the robotaxi in association with a call button, a touch pad, and various sensors mounted on an exterior of the robotaxi even when an error of authentication of the user of the robotaxi using a digital key occurs or when a smart phone in which the digital key is stored dies.

The technical problems to be solved by the present inventive concept are not limited to the aforementioned problems, and any other technical problems not mentioned herein will be clearly understood from the following description by those skilled in the art to which the present disclosure pertains.

According to an embodiment of the present disclosure, a system for authenticating a user of a robotaxi includes a smart phone that requests an authentication of the user based on a digital key, an authentication server that creates a first authentication number, transmits the first authentication number to the smart phone, and receives a second authentication number from the robotaxi when the authentication using the digital key fails, and requests unlocking of a door to the robotaxi when the first authentication number and the second authentication number are the same, and the robotaxi that receives the second authentication number from the user and transmits the second authentication number to the authentication server, unlocks the door in response to the request from the authentication server.

In one implementation, the authentication server may determine a case where the smart phone fails to receive an authentication result within a critical time from a time point of receiving an authentication request from the smart phone as an authentication failure.

In one implementation, the robotaxi may be equipped with a touch keypad located on a door window, and the touch keypad may receive the second authentication number from the user.

According to another embodiment of the present disclosure, a method for authenticating a user of a robotaxi includes requesting, by a smart phone, the authentication of the user based on a digital key, creating, by an authentication server, a first authentication number and transmitting the first authentication number to the smart phone when the authentication using the digital key fails, receiving, by the robotaxi, a second authentication number from the user, transmitting, by the robotaxi, the second authentication number to the authentication server, requesting, by the authentication server, unlocking of a door to the robotaxi when the first authentication number and the second authentication number are the same, and unlocking, by the robotaxi, the door in response to the request from the authentication server.

In one implementation, the transmitting of the first authentication number to the smart phone may include determining a case where the smart phone fails to receive an authentication result within a critical time from a time point of receiving an authentication request from the smart phone as an authentication failure.

In one implementation, the receiving, by the robotaxi, of the second authentication number from the user may include receiving the second authentication number from the user through a touch keypad located on a door window.

According to another embodiment of the present disclosure, a system for authenticating a user of a robotaxi includes a smart phone that calls the robotaxi in response to a request of the user, an authentication server that authenticates the user based on reference biometric information of the user and biometric information transmitted from the robotaxi, creates a first authentication number in case of a normal user, receives a second authentication number from the robotaxi, and requests unlocking of a door to the robotaxi when the first authentication number and the second authentication number are the same, and the robotaxi that provides a voice call with a service associate in a customer service center when the smart phone has died, acquires the biometric information of the user and transmits the biometric information of the user to the authentication server, receives the second authentication number from the user and transmits the second authentication number to the authentication server, and unlocks the door in response to the request from the authentication server.

In one implementation, the robotaxi may include a call button located on a B pillar to receive a request for the voice call with the service associate of the customer service center from the user, a sensor for acquiring the biometric information of the user, and a touch keypad located on a door window to receive the second authentication number from the user.

According to another embodiment of the present disclosure, a method for authenticating a user of a robotaxi includes calling, by a smart phone, the robotaxi in response to a request of the user, providing, by the robotaxi, a voice call with a service associate in a customer service center in response to a request of the user when the smart phone has died, acquiring, by the robotaxi, biometric information of the user and transmitting the biometric information of the user to an authentication server, authenticating, by the authentication server, the user based on reference biometric information of the user and the biometric information transmitted from the robotaxi, creating, by the authentication server, a first authentication number in case of a normal user, requesting, by the authentication server, unlocking of a door to the robotaxi when a second authentication number received from the robotaxi and the first authentication number are the same, and unlocking, by the robotaxi, the door in response to the request from the authentication server.

In one implementation, the requesting of the unlocking of the door to the robotaxi may include receiving, by the robotaxi, the second authentication number from the user, and transmitting, by the robotaxi, the second authentication number to the authentication server.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiments of the present disclosure, a detailed description of the related known configuration or function will be omitted when it is determined that it interferes with the understanding of the embodiments of the present disclosure.

In describing the components of the embodiments according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
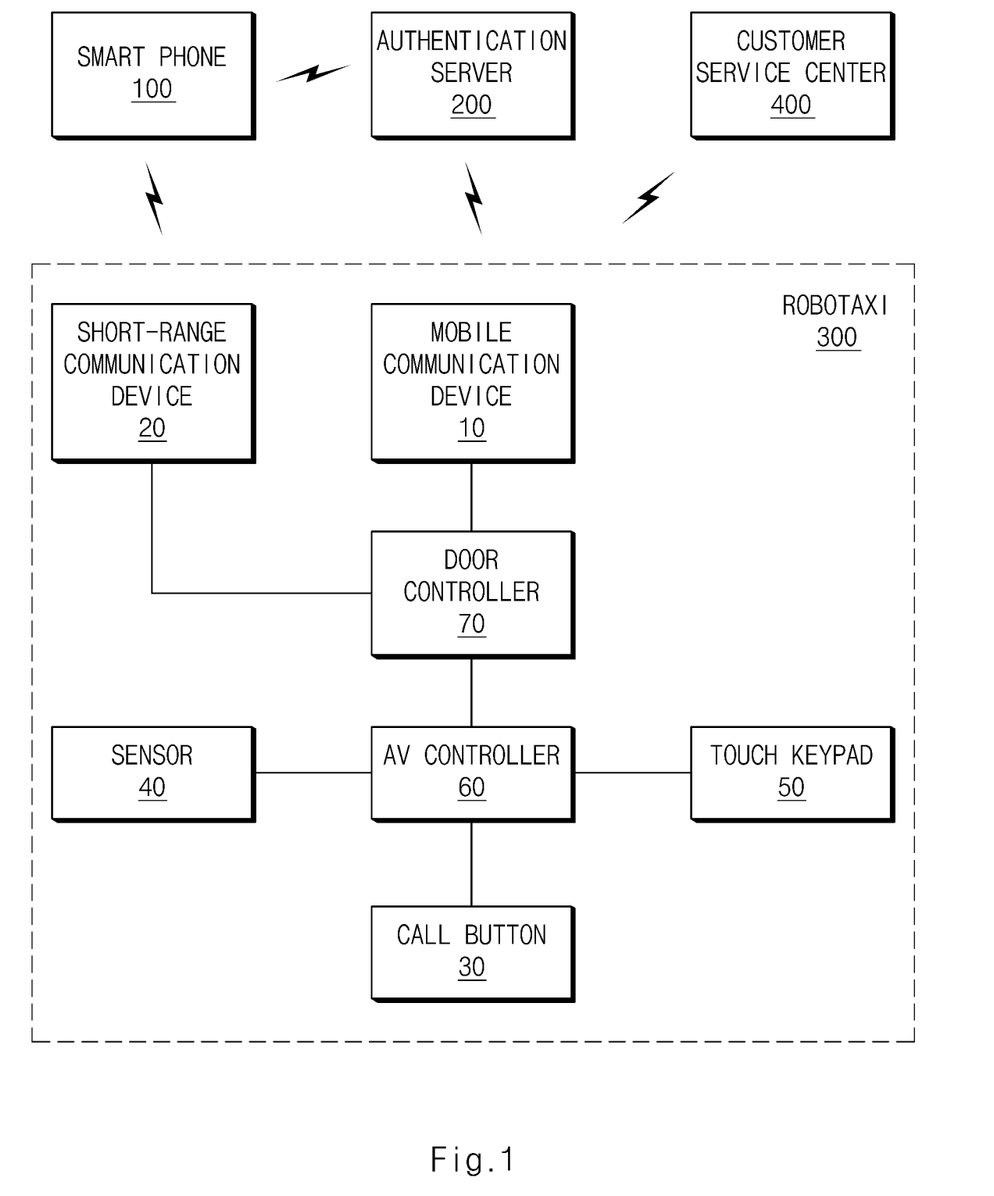
FIG. 1 is a block diagram of a robotaxi user authentication system according to an embodiment of the present disclosure.

FIG. 1 is a block diagram of a robotaxi user authentication system according to an embodiment of the present disclosure.

As shown in FIG. 1, a robotaxi user authentication system according to an embodiment of the present disclosure may include a smart phone 100, an authentication server 200, a robotaxi 300, and a customer service center 400. In this connection, depending on a scheme for implementing the robotaxi user authentication system according to an embodiment of the present disclosure, components may be combined with each other to be implemented as one component or some components may be omitted.

Each of the components will be described. First, a digital key application is installed on the smart phone 100. Such a digital key application may be stored in a memory (not shown). In this connection, the memory may include at least one type of recording media (storage media) of a memory of a flash memory type, a hard disk type, a micro type, a card type (e.g., a secure digital card (SD card) or an eXtream digital card (XD card)), and the like, and/or a memory of a random access memory (RAM), a static RAM (SRAM), a read-only memory (ROM), a programmable ROM (PROM), an electrically erasable PROM (EEPROM), a magnetic RAM (MRAM), a magnetic disk, and an optical disk type.

The smart phone 100 may include a mobile communication module and a wireless Internet module to communicate with the authentication server 200, and may include a short-range communication module to communicate with the robotaxi 300.

In this connection, the mobile communication module may communicate with the authentication server 200 through a mobile communication network built based on technical standards or communication schemes for mobile communication (e.g., a global system for mobile communication (GSM)), a code division multi access (CDMA), a code division multi access 2000 (CDMA2000), an enhanced voice-data optimized or enhanced voice-data only (EV-DO), a wideband CDMA (WCDMA), a high speed downlink packet access (HSDPA), a high speed uplink packet access (HSUPA), a long term evolution (LTE), a long term evolution-advanced (LTE-A), and the like), a 4th generation mobile telecommunication (4G), and a 5th generation mobile telecommunication (5G).

In addition, the wireless Internet module, which is a module for wireless Internet access, may communicate with the authentication server 200 through a wireless LAN (WLAN), a wireless-fidelity (Wi-Fi), a wireless fidelity (Wi-Fi) Direct, a digital living network alliance (DLNA), a wireless broadband (WiBro), a world interoperability for microwave access (WiMAX), a high speed downlink packet access (HSDPA), a high speed uplink packet access (HSUPA), a long term evolution (LTE), a long term evolution-advanced (LTE-A), and the like.

The short-range communication module may support short-range communication using at least one of technologies of a Bluetooth™, a radio frequency identification (RFID), an infrared data association (IrDA), an ultra wideband (UWB), a ZigBee, a near field communication (NFC), and/or a wireless universal serial bus (Wireless USB).

The smart phone 100 may transmit biometric information of a user to the authentication server 200 when signing up for a robotaxi service. In this connection, the biometric information may include a face, an iris, a fingerprint, a handwriting sample, and the like of the user.

The smart phone 100 may call the robotaxi 300 through the robotaxi service, and may request unlocking of a door to a door controller 70 of the robotaxi 300 in a state in which authentication is completed through the authentication server 200.

Hereinafter, operations of the authentication server 200 will be described by dividing a case in which an authentication error occurs despite a normal digital key and a case in which the smart phone 100 dies after calling the robotaxi 300 from each other.

Figure 4:
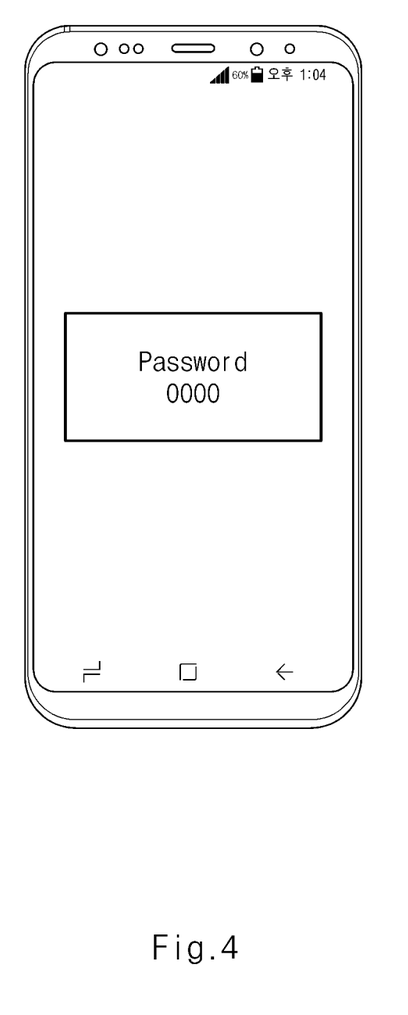
FIG. 4 is an exemplary diagram illustrating a state in which a smart phone equipped in a robotaxi user authentication system according to an embodiment of the present disclosure displays an authentication number.

First, in the case in which the authentication error (an authentication failure) occurs despite the normal digital key, that is, in a case in which the smart phone 100 fails to receive an authentication result (normal or abnormal) within a critical time (e.g., 1.5 seconds) from a time point at which an authentication request is received from the smart phone 100, the authentication server 200 may create an authentication number and provide the authentication number to the smart phone 100 as shown in FIG. 4. In this connection, the authentication failure does not include an authentication failure resulted from an abnormal digital key.

Figure 5:
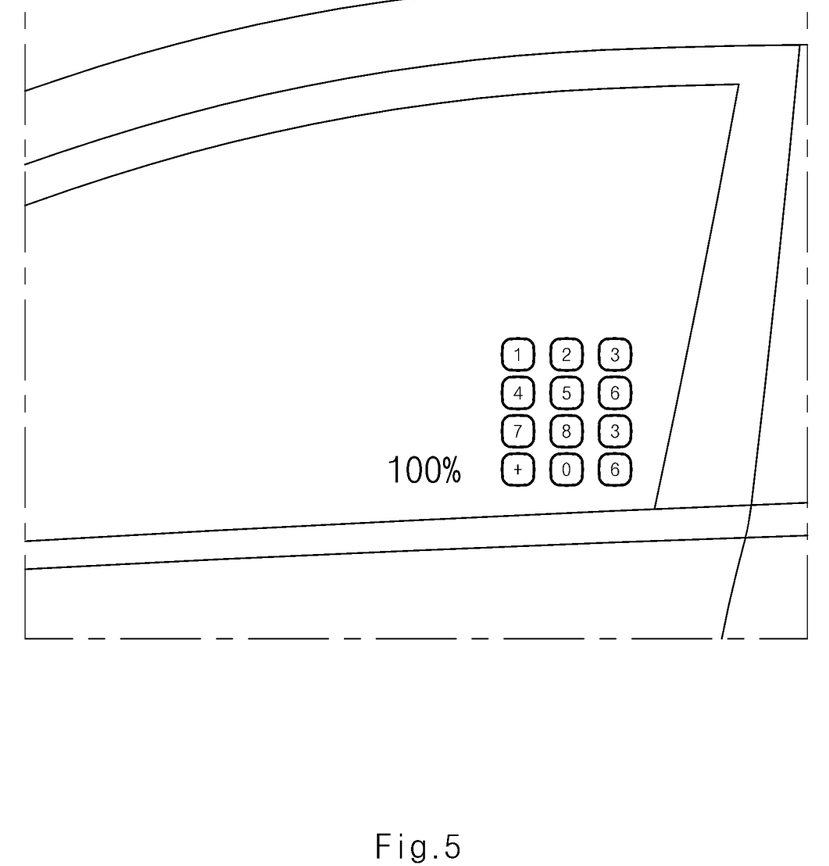
FIG. 5 is an exemplary diagram illustrating a touch keypad equipped on a robotaxi user authentication system according to an embodiment of the present disclosure.

The authentication server 200 may guide the smart phone 100 about the authentication error by the digital key and transmit the authentication number to the smart phone 100. Then, the user inputs the authentication number through a touch keypad 50 equipped on the robotaxi 300 as shown in FIG. 5. The authentication number thus input is transmitted to the authentication server 200, and the authentication server 200 authenticates the authentication number and transmits the authentication result to the door controller 70. Then, the door controller 70 unlocks the door in case of normal authentication, or maintains a locked state of the door in case of abnormal authentication.

Figure 6:
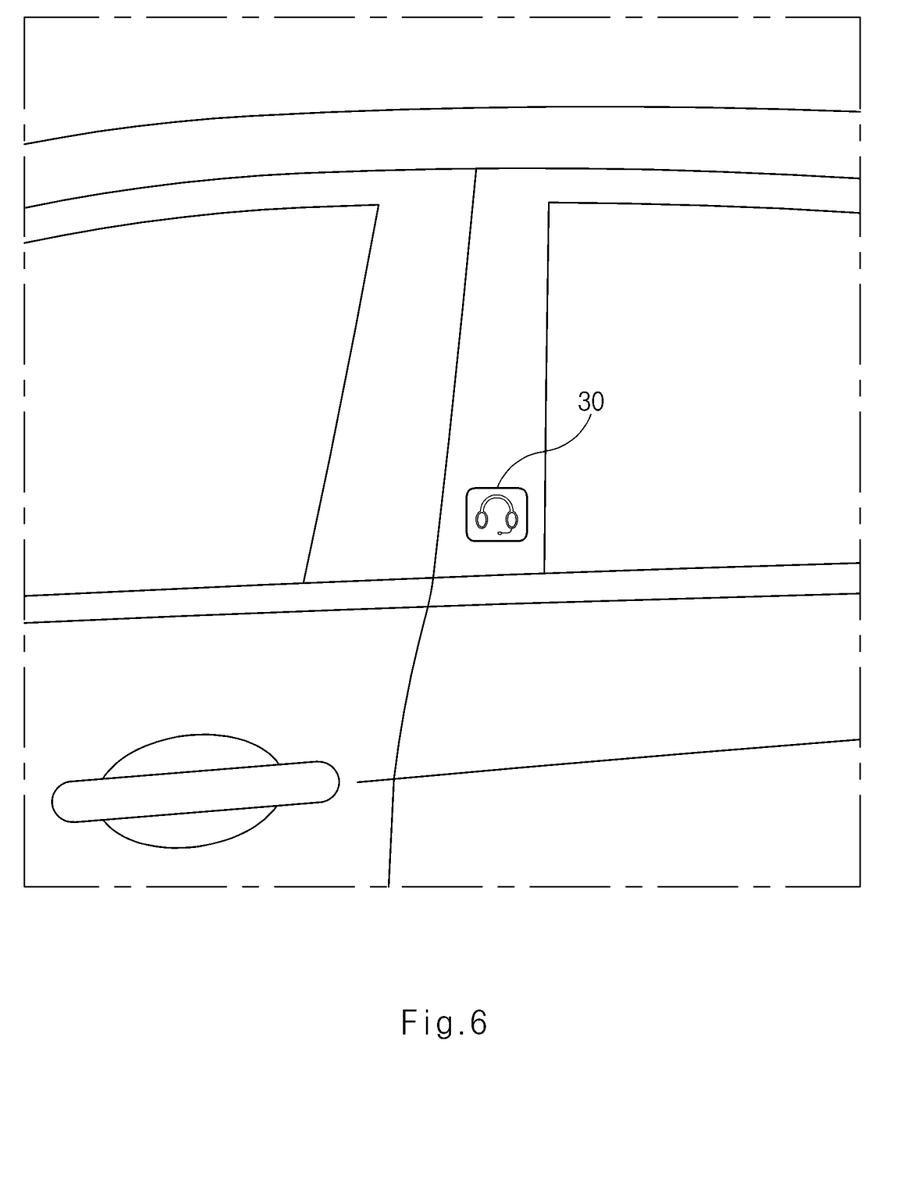
FIG. 6 is an exemplary diagram illustrating a call button equipped on a robotaxi user authentication system according to an embodiment of the present disclosure.

Next, when the smart phone 100 dies after calling the robotaxi 300, as shown in FIG. 6, the user may press a call button 30 equipped on the robotaxi 300 to perform a voice call with a service associate of the customer service center 400. In this connection, the biometric information of the user received from the smart phone 100 is already stored in the authentication server 200.

Thereafter, the user inputs biometric information through a sensor 40 equipped on the robotaxi 300, and the biometric information thus input is transmitted to the authentication server 200.

The authentication server 200 may authenticate the user by comparing the biometric information (reference biometric information) of the user stored in advance with the biometric information of the user transmitted from the robotaxi 300, and provide the authentication result to the service associate of the customer service center 400. In this connection, the authentication server 200 may create the authentication number in a case of a normal user and provide the authentication number to the service associate of the customer service center 400. Then, the service associate of the customer service center 400 provides the authentication number to the user in the case of the normal authentication.

Thereafter, the user inputs the authentication number through the touch keypad 50 equipped on the robotaxi 300. The authentication number thus input is transmitted to the authentication server 200, and the authentication server 200 authenticates the authentication number and transmits the authentication result to the door controller 70. Then, the door controller 70 unlocks the door in the case of the normal authentication, or maintains the locked state of the door in the case of the abnormal authentication.

In one example, the robotaxi 300 may include a mobile communication device 10, a short-range communication device 20, the call button 30, the sensor 40, the touch keypad 50, an audio video (AV) controller 60, and the door controller 70.

Each of the components will be described. First, the mobile communication device 10 is a module that provides a communication interface with the authentication server 200.

The short-range communication device 20 is a module that provides a communication interface with the smart phone 100.

The call button 30 may be located on an exterior (e.g., on a B pillar) of the robotaxi 300, and may be, for example, in association with a telematics terminal (not shown) to request the voice call with the service associate in the customer service center 400. Thus, the user may use the call button 30 without boarding the robotaxi 300.

The sensor 40, which is a module for acquiring a bio-signal of the user, may include at least one of a facial recognition sensor, an iris recognition sensor, a fingerprint recognition sensor, and/or a handwriting recognition sensor.

The touch keypad 50 is a module located on the exterior (e.g., on a door window) of the robotaxi 300 to receive the authentication number from the user. Accordingly, the user may use the touch keypad 50 without boarding the robotaxi 300.

The AV controller 60 may include a voice processing module and an image processing module, and may transmit the biometric information received from the sensor 40 to the door controller 70 and transmit the authentication number received from the touch keypad 50 to the door controller 70.

The door controller 70 may perform overall control such that each component may normally perform the function thereof. Such door controller 70 may be implemented in a form of hardware, may be implemented in a form of software, or may be implemented in a form in which the hardware and the software are combined with each other. Preferably, the door controller 70 may be implemented as a microprocessor, but may not be limited thereto.

The door controller 70 may be implemented as an integrated body control unit (IBU) as an example, may control the locking/unlocking of the door based on the authentication result from the authentication server 200, and may transmit the biometric information or the authentication information received from the AV controller 60 to the authentication server 200 through the mobile communication device 10.

Figure 2:
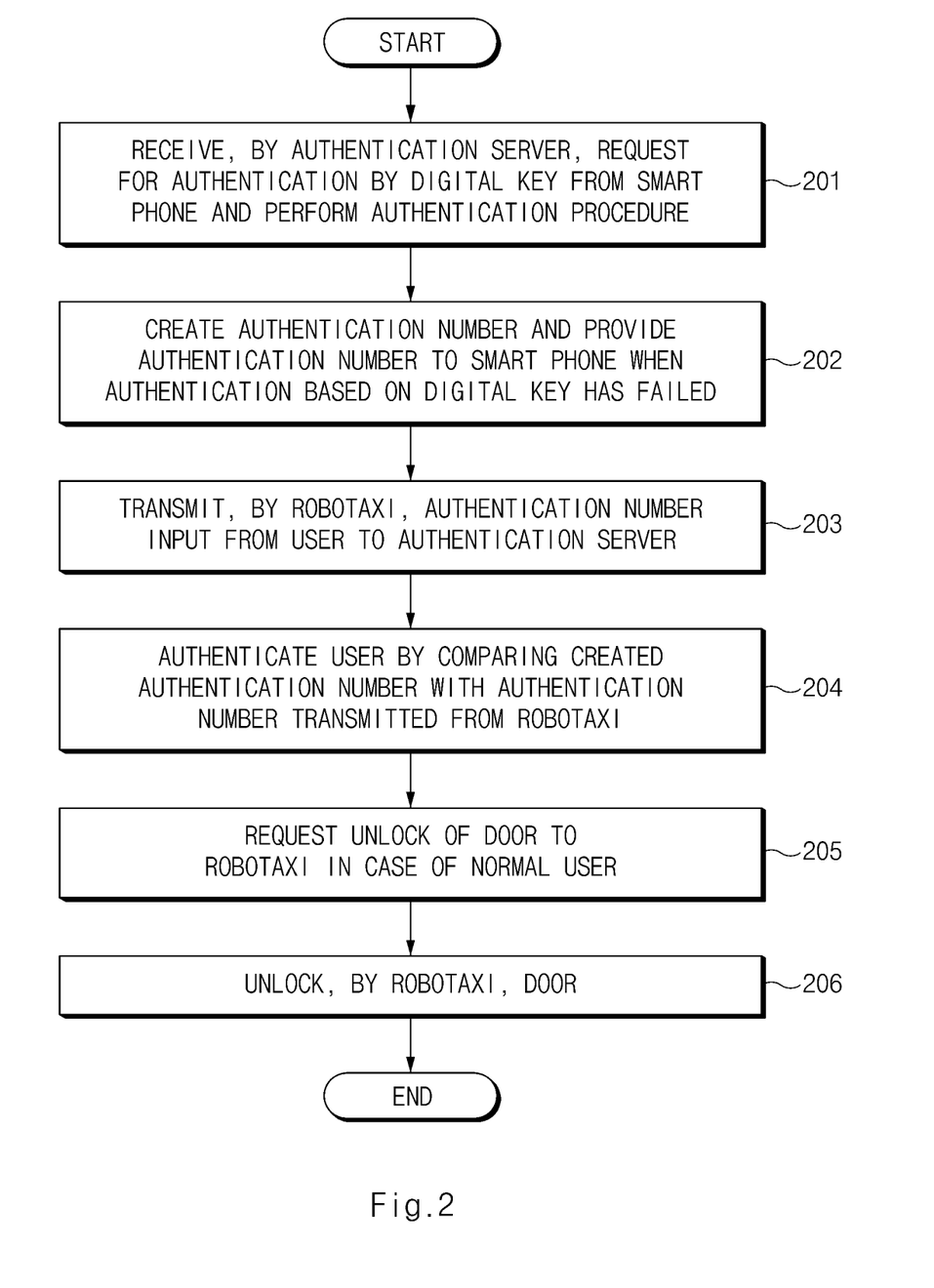
FIG. 2 is a flowchart of a robotaxi user authentication method according to an embodiment of the present disclosure.

FIG. 2 is a flowchart of a robotaxi user authentication method according to an embodiment of the present disclosure, which represents an authentication process in a state in which the user who signed up for the robotaxi service has called the robotaxi 300 through the smart phone 100 thereof and then the robotaxi 300 has arrived at a location where the user is located.

First, the authentication server 200 receives the request for the authentication by the digital key from the smart phone 100 and performs the authentication procedure (201).

Thereafter, in the case in which the authentication error (the authentication failure) occurs despite the normal digital key, that is, in the case in which the smart phone 100 fails to receive the authentication result (normal or abnormal) within the critical time (e.g., 1.5 seconds) from the time point at which the smart phone 100 transmits the authentication request, the authentication server 200 may create the authentication number and provide the authentication number to the smart phone 100 (202). In this connection, the case in which the authentication error occurs may include a case in which a request for the unlocking of the door is not transmitted to the door controller 70, a case in which the authentication server 200 has transmitted the request for the unlocking of the door to the door controller 70, but the door controller 70 has not received the request, a case in which the authentication server 200 has received permission to unlock the door from the door controller 70, but has failed to transmit the permission to the smart phone 100, and the like.

Thereafter, the robotaxi 300 transmits the authentication number input from the user to the authentication server 200 (203).

Thereafter, the authentication server 200 authenticates the user by comparing the created authentication number with the authentication number transmitted from the robotaxi 300 (204). In this connection, the authentication server 200 may determine the user as the normal user when the created authentication number and the authentication number transmitted from the robotaxi 300 are the same.

Thereafter, the authentication server 200 requests the unlocking of the door to the door controller 70 of the robotaxi 300 when the authentication is the normal authentication (205). In this connection, the authentication server 200 does not request the unlocking of the door to the door controller 70 of the robotaxi 300 when the authentication is not the normal authentication.

Thereafter, the door controller 70 of the robotaxi 300 unlocks the door (206).

Figure 3:
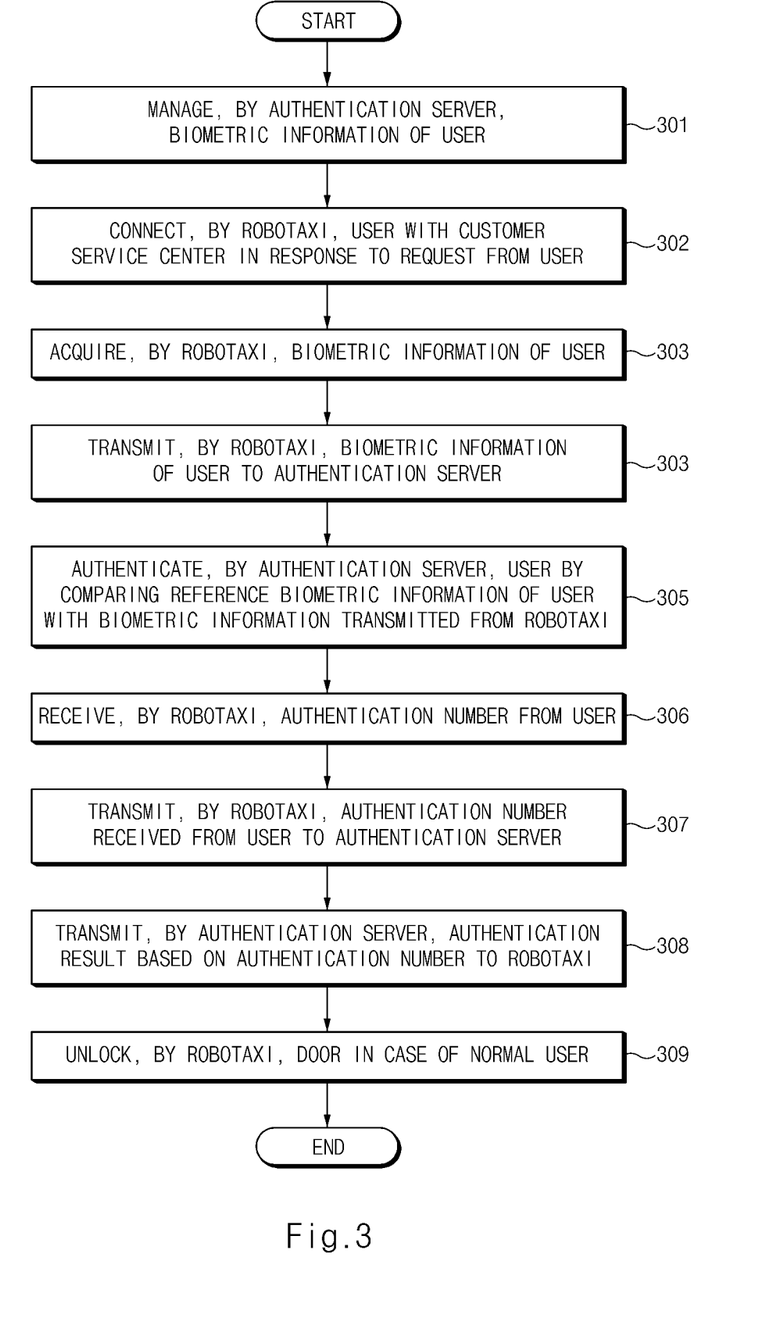
FIG. 3 is a flowchart of a robotaxi user authentication method according to another embodiment of the present disclosure.

FIG. 3 is a flowchart of a robotaxi user authentication method according to another embodiment of the present disclosure, which represents an authentication process in the state in which the smart phone 100 has died after the user who signed up for the robotaxi service has called the robotaxi 300 through the smart phone 100 thereof.

First, the authentication server 200 manages the biometric information of the user received from the user when the user signs up for the robotaxi service (301).

Thereafter, the user may press the call button 30 equipped on the robotaxi 300 to perform the voice call with the service associate of the customer service center 400. That is, the robotaxi 300 connects the user with the customer service center 400 in response to the request from the user (302).

Thereafter, the user may input the biometric information thereof through the sensor 40 equipped on the robotaxi 300. That is, the robotaxi 300 acquires the biometric information of the user through the sensor 40 (303).

Thereafter, the robotaxi 300 transmits the biometric information of the user to the authentication server 200 (304).

Thereafter, the authentication server 200 authenticates the user by comparing the biometric information of the user stored in advance with the biometric information of the user transmitted from the robotaxi 300 (305). The authentication result may be provided to the service associate of the customer service center 400 to which the voice call is connected, and the service associate of the customer service center 400 may provide the authentication number to the user in the case of the normal authentication.

Thereafter, the user may input the authentication number through the touch keypad 50 equipped on the robotaxi 300. That is, the robotaxi 300 receives the authentication number from the user (306).

Thereafter, the robotaxi 300 transmits the authentication number received from the user to the authentication server 200 (307).

Thereafter, the authentication server 200 transmits the authentication result based on the authentication number to the robotaxi 300 (308).

Thereafter, the robotaxi 300 unlocks the door when the user is the normal user, or maintains the locked state of the door when the user is not the normal user (309).

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

The system and the method for authenticating the user of the robotaxi according to an embodiment of the present disclosure as described above may authenticate the user of the robotaxi by authenticating the user of the robotaxi in association with the call button, the touch pad, and the various sensors mounted on the exterior of the robotaxi even when the error of the authentication of the user of the robotaxi using the digital key occurs or when the smart phone in which the digital key is stored dies.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A system for authenticating a user of a robotaxi, the system comprising:
an authentication server configured to:
authenticate the user based on reference biometric information of the user and biometric information transmitted from the robotaxi;
create a first authentication number in case of a normal user;
receive a second authentication number from the robotaxi; and
request unlocking of a door to the robotaxi when the first authentication number and the second authentication number match; and
the robotaxi, which includes a call button located on an exterior of the robotaxi, configured to:
receive a call request for a voice call with a service associate of a customer service center in response a user input to the call button;
provide the voice call with the service associate in the customer service center in response to the call request;
acquire the biometric information of the user;
transmit the biometric information of the user to the authentication server;
receive the second authentication number from the user;
transmit the second authentication number to the authentication server; and
unlock the door in response to the request from the authentication server.

2. The system of claim 1, wherein the call button is located on a B pillar of the robotaxi.

3. The system of claim 1, wherein the robotaxi includes a sensor configured to acquire the biometric information of the user.

4. The system of claim 3, wherein the robotaxi includes a touch keypad configured to receive the second authentication number from the user.

5. The system of claim 4, wherein the touch keypad is located on an outer surface of a door window of the robotaxi.

6. The system of claim 1, further comprising a smart phone configured to call the robotaxi in response to a ride request of the user.

7. A method for authenticating a user of a robotaxi, the method comprising:
receiving, by the robotaxi, a user request from a smart phone;
receiving, by the robotaxi, a call request of the user when the smart phone is unavailable;
providing, by the robotaxi, a voice call with a service associate in a customer service center in response to the call request of the user when the smart phone is unavailable;
receiving, by the robotaxi, a second authentication number from the user, the second authentication number being provided to the user from the service associate;
acquiring, by the robotaxi, biometric information of the user and transmitting the biometric information of the user to an authentication server;
authenticating, by the authentication server, the user based on reference biometric information of the user and the biometric information transmitted from the robotaxi;
creating, by the authentication server, a first authentication number in response to authenticating the user;
requesting, by the authentication server, unlocking of a door to the robotaxi when the second authentication number received from the robotaxi and the first authentication number match; and
unlocking, by the robotaxi, the door in response to the request from the authentication server.

8. The method of claim 7, wherein requesting the unlocking of the door to the robotaxi includes:
receiving, by the robotaxi, the second authentication number from the user; and
transmitting, by the robotaxi, the second authentication number to the authentication server.

9. The method of claim 8, wherein receiving the second authentication number from the user comprises receiving the second authentication number from the user via a touch keypad located on a door window of the robotaxi.

10. The method of claim 7, wherein the robotaxi includes a call button to receive the call request of the user.

11. The method of claim 7, wherein the robotaxi includes a sensor to acquire the biometric information of the user.

12. A method for operating a robotaxi, the method comprising:
receiving a customer service request at the robotaxi by a user outside the robotaxi;
initiating, by the robotaxi, a voice call between the user and a service associate in a customer service center in response to the customer service request of the user;
acquiring, by the robotaxi, biometric information of the user;
transmitting, by the robotaxi, the biometric information of the user to an authentication server;
receiving, at the robotaxi from the user, a second authentication number that the user received from the service associate;
transmitting, by the robotaxi, the second authentication number to the authentication server;
receiving, by the robotaxi from the authentication server, an authentication result of the user that is based on the biometric information and the second authentication number; and
providing access to the robotaxi in response to the authentication result received from the authentication server.

13. The method of claim 12, further comprising receiving, by the robotaxi, a request from a smart phone of the user prior to receiving the customer service request at the robotaxi.

14. The method of claim 12, wherein receiving the customer service request comprises receiving user input from an input device of the robotaxi prior to providing access to the robotaxi, the input device being accessible from outside the robotaxi.

15. The method of claim 12, wherein receiving, at the robotaxi from the user, the second authentication number comprises receiving input from the user at a touch keypad located at an exterior surface of the robotaxi.

16. The method of claim 12, further comprising:
authenticating, by the authentication server, the user based on reference biometric information of the user and the biometric information transmitted from the robotaxi;
creating, by the authentication server, a first authentication number;
determining that the second authentication number received from the robotaxi and the first authentication number match; and
transmitting, by the authentication server to the robotaxi, the authentication result in response to authenticating the user and determining that the second authentication number and the first authentication number match.

17. A robotaxi comprising:
a user input accessible from outside the robotaxi;
a biometric sensor; and
a controller configured to:
  receive a customer service request from the user input;
  initiate a voice call between a user outside the robotaxi and a service associate in a customer service center in response to the customer service request;
  acquire biometric information of the user using the biometric sensor;
  transmit the biometric information of the user to an authentication server;
  receive a second authentication number from the user input;
  transmit the second authentication number to the authentication server;
  receive an authentication result of the user that is based on the biometric information and the second authentication number; and
  provide access to the robotaxi in response to the authentication result.

18. The robotaxi of claim 17, wherein the user input comprises a call button and a touch keypad;
  wherein the controller is configured to receive the customer service request from the call button; and
  wherein the controller is configured to receive the second authentication number from the touch keypad.

19. The robotaxi of claim 18, wherein the call button is located on an external surface of a B pillar of the robotaxi and the touch keypad is located on an outer surface of a door window of the robotaxi.

20. The robotaxi of claim 17, further comprising an AV controller that includes a voice processing module and an image processing module, the AV controller configured to:
  transmit the biometric information from the biometric sensor to the controller; and
  transmit the second authentication number from the user input to the controller.

* * * * *